H. P. POLASKI AND V. A. VAN HORN.
TRACTOR DRIVE GEARING.
APPLICATION FILED FEB. 17, 1921.

1,405,159.

Patented Jan. 31, 1922.
3 SHEETS—SHEET 1.

INVENTORS
HENRY P. POLASKI
VERNON A. VAN HORN.
BY Frank E. Liverance Jr
ATTORNEY.

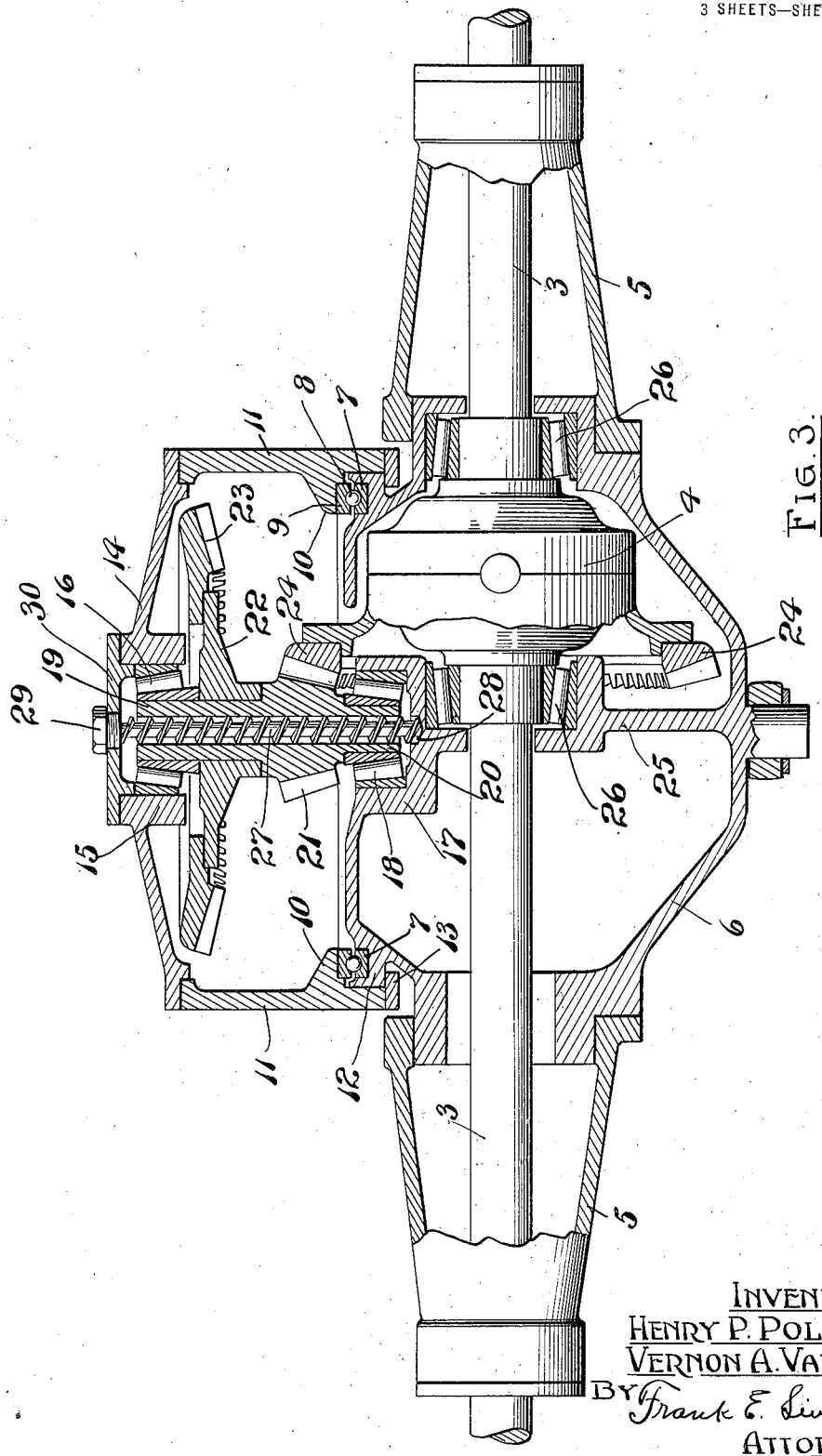

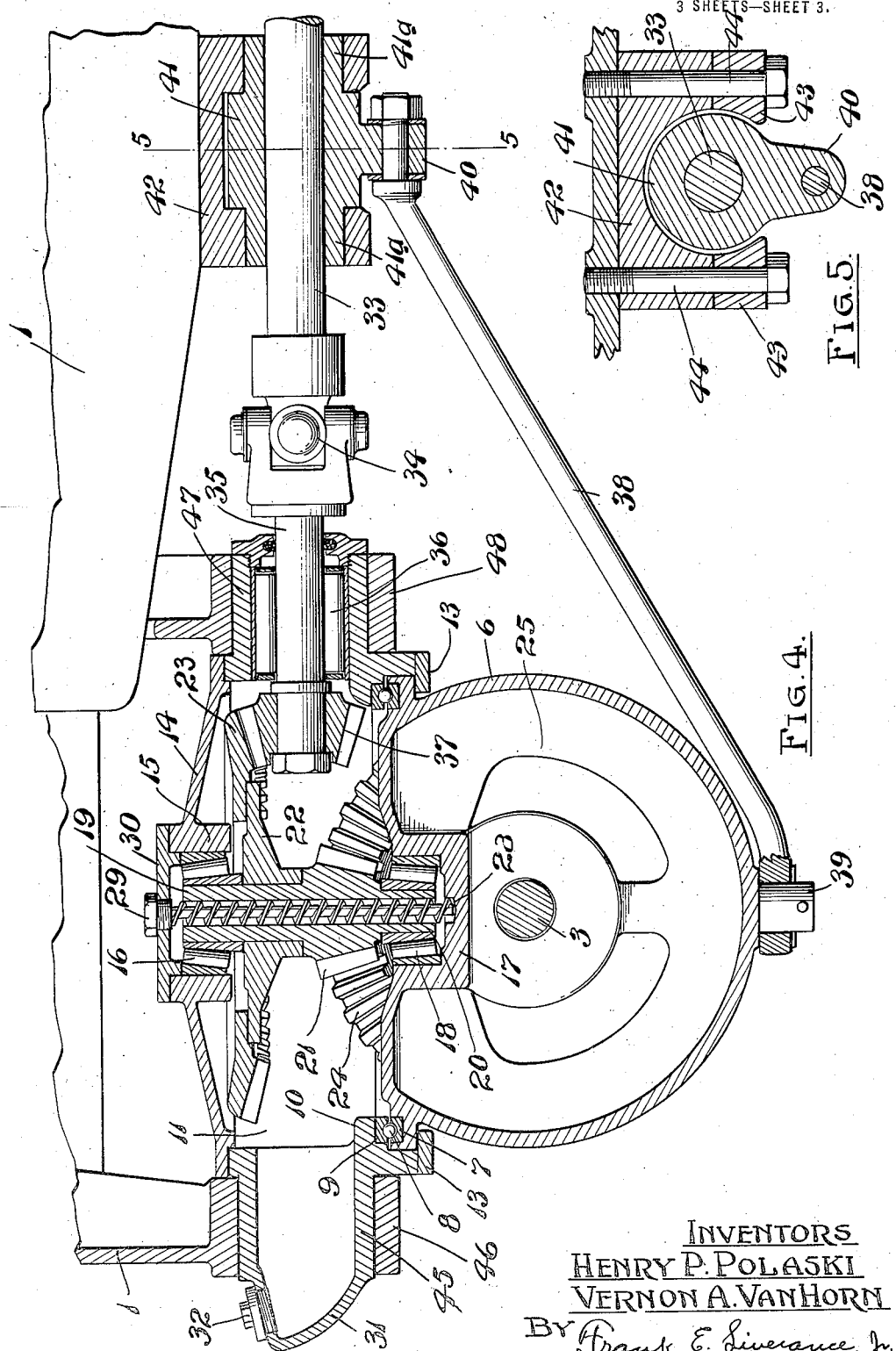

UNITED STATES PATENT OFFICE.

HENRY P. POLASKI AND VERNON A. VAN HORN, OF BIG RAPIDS, MICHIGAN.

TRACTOR DRIVE GEARING.

1,405,159.   Specification of Letters Patent.   Patented Jan. 31, 1922.

Application filed February 17, 1921. Serial No. 445,679.

*To all whom it may concern:*

Be it known that we, HENRY P. POLASKI, and VERNON A. VAN HORN, citizens of the United States of America, residing at Big Rapids, in the county of Mecosta and State of Michigan, have invented certain new and useful Improvements in Tractor Drive Gearing, of which the following is a specification.

This invention relates to a tractor and particularly to driving gearing connection for a tractor or similar machine. A primary object and purpose of the invention is to provide an improved driving gearing for the front wheels of the tractor which is very compact, strong and durable, and one which is particularly capable, from the novel design which we have devised, of withstanding the severe strains to which it is subjected in service. A further object of the invention is to construct a mechanism of the character stated which is particularly simple and relatively easy to manufacture and assemble. A still further object of the invention is to provide a construction in which all parts requiring lubrication are automatically supplied with lubricant during the operation of the tractor. Many other objects and purposes than those specifically enumerated at this time will appear as understanding of the invention is had from the following description taken in connection with the accompanying drawings, in which, Fig. 1 is a front elevation of a tractor made in accordance with our invention, showing the capability of the same to pass over rough ground.

Fig. 3 is a vertical section taken longitudinally of said front axle and illustrating the driving gearing.

Fig. 4 is a vertical section taken longitudinally of the front portion of the tractor and transversely of the front axle thereof, and Fig. 5 is a vertical transverse section on the plane of line 5—5, of Fig. 4.

Like reference characters refer to like parts in the different figures of the drawings.

Figure 1:
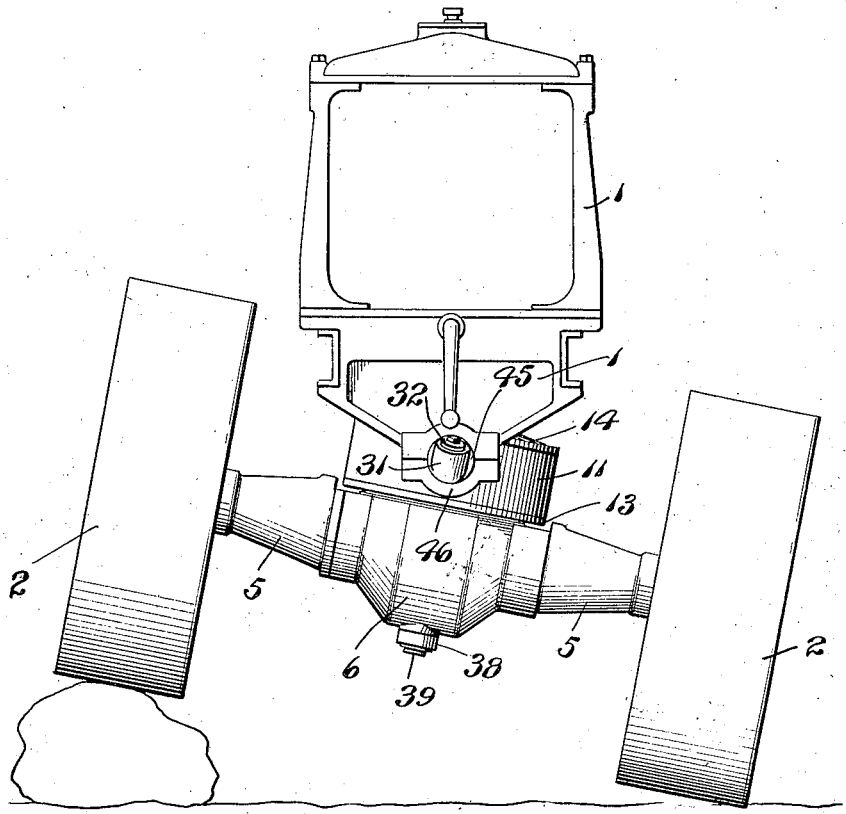
Figure 2:
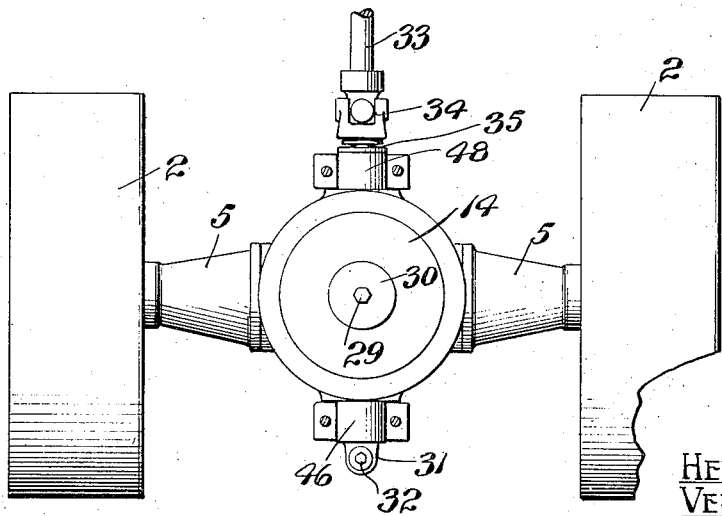
Fig. 2 is a plan view of the front axle construction of the tractor with which our invention is concerned.

The tractor body or chassis is indicated fragmentarily at 1, and the front wheels carrying the same at 2, the same being attached to the outer ends of the front axle parts 3 which come together under the body and are associated together by means of any well known or preferred differential gearing as shown at 4. The axle shafts 3 are housed in axle housings 5 which extend outwardly from each side of the differential housing 6.

At its upper side the differential housing carries a circular ring or ball race 7 on which a plurality of ball bearings 8 are placed, being covered and retained by a similar inverted ring 9 which is secured under an inwardly extending annular ledge 10 projecting from the sides 11 of a cylindrical housing located between the differential housing and the tractor body or chassis 1. For the support of the ball race ring 7, the differential housing is formed with an annular horizontally extending ledge 12 over which the ledge 10 of the cylindrical housing extends, the sides 11 thereof passing downwardly by the outer edges of said ledge 12 and having a ring 13 attached at their lower edges which passes under the lower side of ledge 12. The differential housing, and connected axle and front wheels, accordingly have free turning movement about a vertical axis positioned at the center of the rings 7 and 9.

The housing having sides 11 is closed at its upper end by a cover plate 14, at the center of which a vertical cylindrical journal 15 is made for the reception of a roller bearing 16. The upper side of the differential housing directly below is formed with a cup-like journal 17 for the reception of a similar bearing 18. In these bearings the upper and lower ends 19 and 20 projecting from a gearing unit are rotatably mounted. Said gearing unit comprises a lower bevelled pinion 21 immediately above which a web 22 is located, extending horizontally outward and having a bevelled ring gear 23 connected therewith as shown. This gearing unit may be made integral or of separate parts as shown, the same, however, being secured in fixed relation to each other with the same effect as though integrally formed. The pinion 21 is in mesh with the ring gear 24 of the differential gearing and drives the same. In practice, a reinforcing and strengthening web 25 is located vertically across the differential housing directly under the journal 17, serving to support it and also making a convenient carrier for one of the bearings 26 for the differential gearing, the other of which is mounted in an end of the differential housing, as shown.

An opening is made vertically through the gearing unit and a conveyor screw threaded shaft 27 is located therein, at its lower end being seated in a relatively small depression 28 made in the bottom of the journal 17. Its upper end is engaged by a threaded plug 29 inserted through the cover 30 which is attached to the main cover 14 of the gear unit housing to close the end of the upper journal 15. It is apparent that oil or similar lubricant which may be entered in the gear unit housing through the opening in the neck 31 (see Fig. 4) normally seeks the lowest level, filling the cup-like journal 17 and overflowing therefrom into the differential housing 6. The opening in the neck 31 is normally closed by a plug 32 which is readily removed by unscrewing the same. The rotation of the gearing unit, as later described causes the lubricant to work upwardly along the conveyor shaft 27 and thence out at the upper end of the gearing unit to the bearing 16 as will be readily apparent; and any excess over what is needed for the said bearing overflows the ring gear 23 on to the teeth on the under side thereof. The continual rotation of the differential ring gear 24, immersed as it is at its lower portion in lubricant causes a continual carrying of lubricant to the pinion 21, the excess dropping therefrom to the lower bearing 18 and into the cup journal therefor.

The drive shaft for the tractor is disposed horizontally under the tractor body and lengthwise thereof, as indicated at 33 and has a universal joint connection 34 with a short shaft 35 extending into the gear unit housing and having a mounting in a bearing 36 in said housing. The inner end of shaft 35 carries a pinion 37 which is in engagement with the ring gear 23 of the gearing unit. The shaft 33 is driven in any suitable manner from the engine of the tractor and it is evident that with a driving construction as described, the front axle may be driven by the engine. The drive of the rear axle is not shown and described in the present invention, being of well known and standard construction.

The differential housing is braced by a diagonal brace rod 38 connected at one end to a pin 39 which depends from the housing and at the other end to a depending lug 40 on a member 41 substantially of cylindrical form and which has reduced ends 41ª, said member being seated in a block 42 attached to the chassis 1, and held therein by clamping members 43 and attaching bolts 44 therefor. The shaft 33 passes through the member 41 as shown.

The gearing unit housing has two cylindrical extensions 45 and 47 in alinement with the drive shaft, the first one carrying the oil inlet neck 31 at its front end, and the latter having the shaft bearing 36 therein. It is by these extensions that the gearing unit housing and attached differential housing and front axle are connected to the chassis, clamps 46 and 48 encircling the under sides of said extensions 45 and 47, and the chassis frame being properly formed to receive the upper curved sides of the extensions. The clamps 46 and 48 are fixedly secured to the chassis in any preferred manner, and the gearing unit housing with attached parts is free to turn about a horizontal axis in alinement with the axis of the drive shaft by reason of this construction. This is of value when one front wheel 2 is raised to a higher point than the other, as shown in Fig. 1, the tractor body or chassis remaining horizontal yet with a free movement to the front axle.

With the construction described, the front axle may be driven yet at the same time turned about a vertical axis for change of direction in the movements of the tractor, and also tilted to the horizontal while the body of the tractor remains horizontal. The very compact construction of the driving gearing unit is an important feature of the invention. There is relatively short leverage on the housing members for any force acting thereon, and little danger of any breakage of parts from strain. The gearing unit is a solid and compact unit capable of withstanding tremendous strains and the driving pinion 21 is so closely positioned relative the driven gear 23, and directly connected thereto that disruption from torsional strains is practically impossible. This close couple of the pinion 21 and gear 23 of the gearing unit also greatly reduces the height of the gearing unit housing and brings the bearings 16 and 18 closely together with a resultant elimination of destructive forces in the gearing unit and housing therefor. The construction is particularly well adapted as a driving gearing for tractors and similar heavy motor vehicles, especially well adapted to withstand the heavy strains to which subjected when in use, due primarily to the reduction of the driving gearing to the lowest vertical height possible. The appended claims define the invention and we consider ourselves entitled to all modifications in structure comprehended by and coming within the scope of such claims.

We claim:

1. In a machine of the class described, the combination of a divided axle, differential gearing connecting the parts of the axle, including a ring gear, a differential housing covering the differential gearing, a gearing unit housing mounted above the differential housing and connected thereto to turn on said differential housing about a vertical axis, said ring gear of the differential gearing extending at its upper portion into the gearing unit housing, a chassis to which the gearing unit housing is connected for turning movements about a horizontal axis longitudinally of the chassis, a drive shaft in alinement with said horizontal axis of turning of the gearing unit housing, a bevelled pinion, a second shaft carrying said pinion and rotatably mounted in a side of said gearing unit housing, a universal joint connecting the two shafts, and a gearing unit mounted for rotation between the upper sides of the two housings, and having bearing at its upper end in the upper side of the gearing unit housing and at its lower end in the upper side of the differential housing, said gearing unit including a lower bevelled pinion in engagement with the differential ring gear and a bevelled gear lying immediately above said pinion and driven by the first mentioned bevelled pinion, substantially as and for the purposes described.

2. In a machine of the class described, the combination of a divided axle, a differential gearing connecting the parts of the axle, including a ring gear, a differential housing for the differential gearing, a gearing unit housing located on and above the differential housing and mounted thereon to turn about a vertical axis, said ring gear of the differential gearing extending at its upper portion into the gearing unit housing, a gearing unit mounted for turning movement about a vertical axis between the upper sides of the two housings, said gearing unit including a lower bevelled pinion in engagement with the differential ring gear and a bevelled gear located immediately above the pinion, and means engaging with said bevelled gear for driving the gearing unit, substantially as described.

3. In a machine of the class described, the combination of a divided axle, a differential gearing connecting the parts of the axle, including a ring gear, a differential housing for the differential gearing, said housing at its upper portion having an outwardly extending annular ledge, and said ring gear at its upper portion extending above the upper side of the housing, a gearing unit housing located over the differential housing, means for mounting said gearing unit housing on said ledge for turning movements about a vertical axis, a cup-like journal made in the upper side of the differential housing, a journal directly above the first journal in the upper side of the gearing unit housing, a gearing unit having bearing at its upper and lower ends in said journals, said unit including a lower bevelled pinion engaging the differential ring gear and an upper bevelled gear immediately above the pinion, and means for driving the gearing unit engaged with said upper bevelled gear, substantially as and for the purposes described.

4. In a machine of the class described, the combination of a divided axle, a differential gearing connecting the parts of the axle, said gearing including a ring gear, a differential housing for the differential gearing, said housing including an upper side in which a cup-like journal is formed and a vertical web extending across the housing immediately below the journal to strengthen the same and said ring gear extending at its upper portion above the upper side of the housing, a gearing unit housing mounted on and above the differential housing for turning movements about a vertical axis, said housing having an upper side with a central journal therein directly above the cup-like journal, bearings in said journals, a gearing unit disposed between the upper sides of the housings and rotatably mounted at its ends in said bearings, said gearing unit comprising a lower pinion in engagement with the differential ring gear and an upper bevelled gear located directly above and closely adjacent the pinion, and means for driving the gearing unit by engagement with the bevelled gear thereof, substantially as described.

5. In a machine of the class described, a differential gearing including a ring gear, a housing therefor having an upper side above which the upper portion of the ring gear extends, a second housing mounted on and above the differential housing for turning movements about a vertical axis, a gearing unit mounted between the upper sides of the two housings and having bearings at its upper and lower ends therein, said gearing unit including a pinion in engagement with the differential ring gear, and a bevelled gear located closely adjacent the pinion, and means for driving the gearing unit through engagement with said bevelled gear, substantially as described.

6. In a machine of the class described, a differential gearing, said gearing including a ring gear, a housing therefor having an upper side above which the upper portion of the ring gear extends, a second housing mounted on and above the differential housing for turning movements about a vertical axis, front and rear trunnion extensions to the second housing, a chassis frame in which said trunnions are rotatably mounted, a gearing unit mounted in bearings carried by the upper sides of the two housings, said gearing unit including a pinion in engagement with the differential ring gear and a closely adjacent gear, a shaft rotatably mounted in one of said trunnion extensions, means for driving said shaft, and a pinion carried by the inner end of said shaft in engagement with said gear of the gearing unit, substantially as described.

7. In a machine of the class described, a divided axle, a differential gearing connecting the two parts of the axle, said gearing including a ring gear, a housing for the differential gearing having a substantially flat upper side, an annular ledge extending from the housing at its upper portion, a second housing including an inwardly extending annular ledge placed around the ledge of the differential housing with the ledges one over the other, ball race and retaining rings attached to the adjacent sides of the ledges, anti-friction balls between said rings, a securing ring connected to the lower edges of the sides of the second housing and extending under the ledge of the differential housing, a cover to the second housing, a gearing unit located in the second housing and having bearings at its upper and lower ends in said cover and the upper side of the differential housing, said gearing unit having a pinion engagement with the differential ring gear which extends at its upper portion through the upper side of the differential housing, and also including an additional gear located closely adjacent the pinion, and means for driving the gearing unit by engagement with said additional gear, substantially as described.

In testimony whereof, we hereunto affix our signatures.

HENRY P. POLASKI.
VERNON A. VAN HORN.